United States Patent
Cosserat et al.

(10) Patent No.: US 11,297,682 B2
(45) Date of Patent: Apr. 5, 2022

(54) METHOD FOR INDIRECTLY ACTIVATING AT LEAST ONE CONNECTED OBJECT AND ASSOCIATED SYSTEM

(71) Applicant: SOMFY ACTIVITES SA, Cluses (FR)

(72) Inventors: Hubert Cosserat, Vetraz Monthoux (FR); Thibaut Desbrugeres, Araches la Frasse (FR); Emmanuel Pauchard, Amancy (FR)

(73) Assignee: SOMFY ACTIVITES SA, Cluses (FR)

( * ) Notice: Subject to any disclaimer, the term of this patent is extended or adjusted under 35 U.S.C. 154(b) by 0 days.

(21) Appl. No.: 16/764,660

(22) PCT Filed: Nov. 19, 2018

(86) PCT No.: PCT/EP2018/081801
§ 371 (c)(1),
(2) Date: May 15, 2020

(87) PCT Pub. No.: WO2019/097057
PCT Pub. Date: May 23, 2019

(65) Prior Publication Data
US 2020/0288534 A1    Sep. 10, 2020

(30) Foreign Application Priority Data

Nov. 17, 2017   (FR) ..................................... 1760843

(51) Int. Cl.
*H04W 4/00* (2018.01)
*H04W 80/04* (2009.01)
(Continued)

(52) U.S. Cl.
CPC ........... *H04W 80/04* (2013.01); *H04W 36/14* (2013.01); *H04W 48/18* (2013.01); *H04W 88/06* (2013.01); *H04W 92/02* (2013.01)

(58) Field of Classification Search
CPC ..... H04W 80/04; H04W 84/12; H04W 84/18; H04W 84/20; H04W 84/22; H04W 36/14;
(Continued)

(56) References Cited

U.S. PATENT DOCUMENTS

2009/0138713 A1\* 5/2009 Veillette .............. H04L 67/2814
713/171
2011/0164527 A1\* 7/2011 Mishra .................. H04L 45/123
370/252

(Continued)

FOREIGN PATENT DOCUMENTS

WO    2016/086017 A1    6/2016
WO    2017/153093 A1    9/2017

OTHER PUBLICATIONS

International Search Report, dated Feb. 11, 2019, from corresponding PCT application No. PCT/EP2018/081801.

*Primary Examiner* — Huy C Ho
(74) *Attorney, Agent, or Firm* — Nixon & Vanderhye (57) ABSTRACT

Disclosed is a method for indirectly activating at least one connected object intended to be joined to a network of connected objects, the network of connected objects including at least one network organizing agent and a commissioning agent, each including a communication module, the communication module including a first radiofrequency interface suitable for communicating according to a first communication protocol, the method including a step of collecting information that is useful for connecting at least one connected object to the network of connected objects by a mobile terminal, a step of transmitting, by the mobile terminal, the collected information to the commissioning agent and a step of inputting at least one connected object into the network of connected objects using information useful for connecting the connected object.

20 Claims, 2 Drawing Sheets

(51) Int. Cl.
*H04W 36/14* (2009.01)
*H04W 48/18* (2009.01)
*H04W 88/06* (2009.01)
*H04W 92/02* (2009.01)

(58) Field of Classification Search
CPC ..... H04W 36/16; H04W 48/18; H04W 88/06; H04W 88/182; H04W 92/02; H04W 88/04
USPC .......................................................... 370/331
See application file for complete search history.

(56) References Cited

U.S. PATENT DOCUMENTS

| | | | |
|---|---|---|---|
| 2014/0044007 A1* | 2/2014 | Smadi | H04W 48/20 370/254 |
| 2015/0172391 A1* | 6/2015 | Kasslin | H04W 52/0229 370/338 |
| 2016/0088424 A1* | 3/2016 | Polo | H04W 4/80 455/41.1 |
| 2016/0094398 A1* | 3/2016 | Choudhury | H04L 45/42 370/254 |
| 2020/0084277 A1* | 3/2020 | Somaraju | H04L 12/2807 |

* cited by examiner

METHOD FOR INDIRECTLY ACTIVATING AT LEAST ONE CONNECTED OBJECT AND ASSOCIATED SYSTEM

BACKGROUND OF THE INVENTION

Field of the Invention

The present invention relates to the field of connected objects, also called Internet Of Things (IOT). The present invention more specifically relates to a method for commissioning a connected object and an associated commissioning system.

Description of the Related Art

The addition of a connected object to a network of connected objects requires a commissioning phase. The commissioning phase consists of securely exchanging a password between the network and the connected object intended to join the network. The new connected object is only associated with the network when the identification information is authenticated. Once the connected object has joined the network, the connected object can participate in the network, that is to say, communicate with the other connected objects of the network.

The commissioning phase is one of the most critical phases in the security of the field of connected objects. The main difficulty lies in the secure transmission of the password between the network of connected objects and the connected object intended to join said network. It is necessary to ensure that the connected object to which the password will be given is the correct recipient, and not a malicious connected object listening to the network. Additionally, the password must be communicated in an encrypted manner in order to ensure that the other connected objects listening to the communications cannot decode the communication.

The addition of a connected object to a network is carried out by a commissioning device or commissioner. The commissioner must have a communication link with the connected object joining the network, typically the radiofrequency link. If the commissioner and the connected object joining the network both use the same communication protocol, for example protocol IEEE 802.15.4, this is referred to as native commissioner. Such a commissioner is capable of communicating directly with the connected object and can establish a secure link between them in order to exchange the necessary information for the connection.

The commissioner can also be a device outside the network of connected objects not using the communication protocol of the network of connected objects. It can, for example, involve a desktop or laptop computer, a touch-sensitive tablet, a smartphone, or any other equivalent computer device. In this case, the non-native commissioner must use a gateway ensuring the connection between the commissioner and the communication protocol of the network of connected objects. This gateway is called border router. Typically, the commissioner uses a Wi-Fi link in order to communicate with the border router. A problem arises when the commissioner, for example a smartphone, is connected to the border router via a Wi-Fi link. Indeed, some smartphones favor transmission via Wi-Fi over data transmission. Thus, when an installer is connected to the border router by Wi-Fi, and it wishes to access a webpage, the request from the commissioner will be sent to the border router instead of being sent to an Internet server. The commissioner will therefore not be able to access the desired webpage. To access the Internet, the installer will have to disconnect the commissioner from the border router, and therefore interrupt the commissioning procedure, then connect to an Internet server.

A second problem comes from the fact that the installer must stay present throughout the entire commissioning phase of the connected object(s) and must wait for the end of this phase before disconnecting the border router.

Another problem related to this method is that the border router is an additional device used only for the commissioning phase of the connected objects. The installer must provide this device with the connected objects to be commissioned, and once the commissioning phase is complete, the installer is required to take it away with him. The only purpose of this device is to establish the link between the non-native commissioner and the network of connected objects.

In this context, it is interesting to offer a solution allowing a mobile terminal not using the communication protocol of the network of connected objects to commission one or several connected objects without using a border router.

It is known to use a commissioner belonging to the network of connected objects (native commissioner) in order to perform the commissioning phase of a connected object. Using a native commissioner makes it possible to do away with a border router. A problem arises when the network of connected objects does not have any connected object with a man-machine interface. This case may for example arise in a home automation installation for example comprising essentially actuators, control points and/or lighting devices. In the absence of man-machine interface, the installer does not have any means to enter the information necessary to connect a connected object intended to join the network.

The same problem arises when a connected object, intended to join a network, only has a few buttons or a keyboard comprising very small keys, thus forming an interface that is not very ergonomic. One aim of the invention is in particular to correct all or some of the aforementioned drawbacks by proposing a solution making it possible to do away with a border router during the commissioning phase, while facilitating this phase for an installer for any type of connected object.

SUMMARY OF THE INVENTION

To that end, the invention relates to a method for indirect commissioning of a connected object intended to join a network of connected objects, the network of connected objects comprising at least an organizer of the network and a commissioner, each including a communication module, the communication module comprising a first radiofrequency interface suitable for communicating according to a first communication protocol, the method comprising:
 a step for collecting useful information for the connection of at least one connected object to the network of connected objects by a mobile terminal other than a border router, the mobile terminal comprising a communication terminal configured to communicate according to a second communication protocol,
 a step for transmission, by the mobile terminal, of the collected information to the commissioner,
 a step for entry, by at least one connected object, into the network of connected objects using information useful for the connection of said connected object.

According to one embodiment, the method further comprises a step for establishing functional links between the various connected objects implemented by the organizer of the network.

According to one embodiment, the method further comprises a step for pre-configuring at least one connected object.

According to one embodiment, the pre-configuring step comprises a sub-step for pre-configuring functional links of at least one connected object.

According to one embodiment, the step for establishing functional links comprises:
- a sub-step for receiving a radiofrequency message containing the functional links,
- a sub-step for reading functional links in a memory of the organizer of the network, and
- a sub-step for configuring the network as a function of the functional links.

According to one embodiment, the step for transmitting collected information comprises:
- a sub-step for activating a second communication interface of the commissioner operating according to the second communication protocol, and
- a sub-step for transmission, by the radiofrequency communication module of the mobile terminal, of the information collected via a link using the second communication protocol.

According to one embodiment, the second communication protocol is the Bluetooth standard.

According to one embodiment, the Bluetooth-type link is a Bluetooth low energy link.

According to one embodiment, the step for transmitting collected information comprises:
- a sub-step for connecting the mobile terminal to the commissioner by means of a wired connection, and
- a sub-step for transmission, by the mobile terminal, of information collected via the wired connection.

According to one embodiment, the step for entry of at least one connected object into the network comprises:
- a sub-step for activation of the radio interface working according to the first communication protocol of the radiofrequency communication module of the commissioner,
- a sub-step for reception of a request from the connected object intended to join the network by the radiofrequency communication module of the commissioner, and
- a sub-step for authentication of the connected object intended to join the network.

According to another aspect, the invention relates to a system for indirectly commissioning at least one connected object, comprising:
- a network of connected objects comprising at least an organizer of the network and a commissioner,
- at least one connected object intended to join the network of connected objects,
- at least one mobile terminal configured to carry out the indirect commissioning method according to one of the preceding claims, each connected object including a radiofrequency communication module comprising a first radiofrequency interface suitable for communicating according to a first communication protocol.

According to one embodiment, the organizer of the network implements the functions of commissioner.

BRIEF DESCRIPTION OF THE DRAWINGS

Other particularities and advantages of the present invention will appear more clearly upon reading the following description, provided as an illustration and non-limitingly, and done in reference to the appended drawings, in which.

DETAILED DESCRIPTION OF THE EMBODIMENTS

Hereinafter, the term "network" will refer to a network of connected objects.

Figure 1:
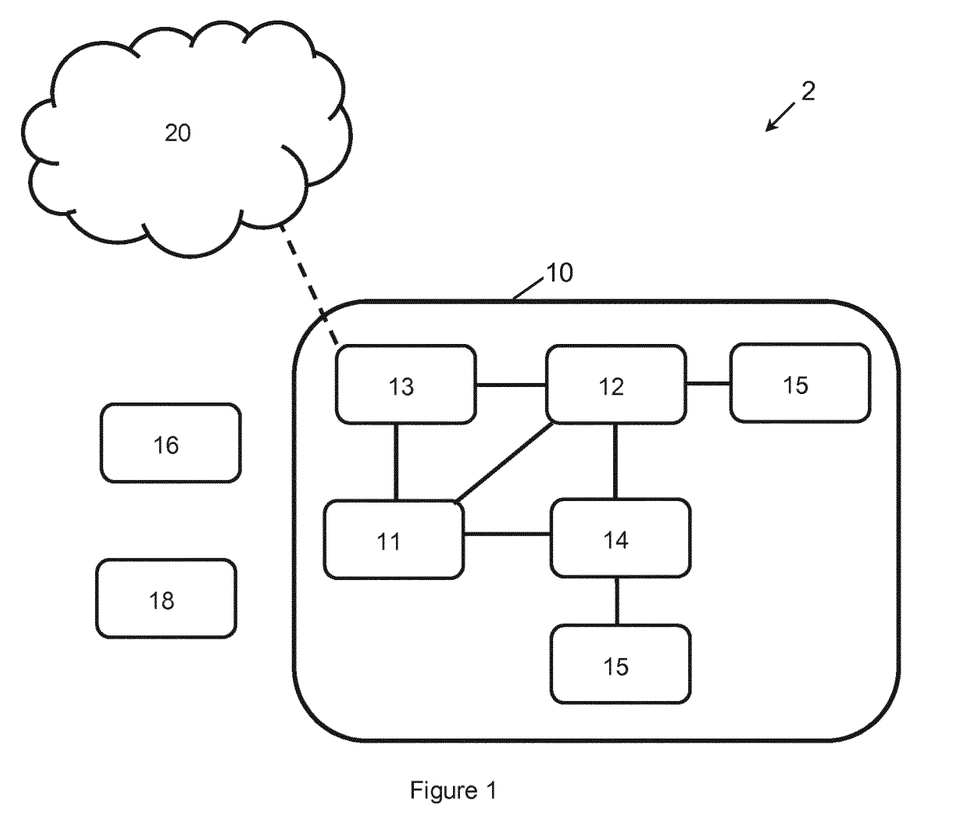
FIG. 1 shows an embodiment of a system for indirect commissioning of a connected object.

FIG. 1 shows an exemplary embodiment of a system 2 for indirect commissioning of a connected object 6 for joining a network 10 of connected objects. In this example, the network is a wireless network configured to dialogue according to a first communication protocol, which is preferably the IEEE 802.15.4 communication protocol. According to one variant embodiment, it may use the ZigBee protocol. The network has a meshed architecture. The connected objects, elements of the network, can be routers 11, 12, 13, 14 or end equipment 15. In order to communicate with one another, each connected object comprises at least a radiofrequency communication module comprising a first radiofrequency network interface able to exchange, over the network, radiofrequency messages according to the first communication protocol.

The routers are configured to receive and transmit radiofrequency messages over the network according to at least one communication protocol.

These routers comprise a second network interface able to exchange, over the network, messages according to a second communication protocol. According to one embodiment, the second network interface is a radiofrequency network interface configured to exchange radiofrequency messages over the network. It may for example involve the Bluetooth standard, and preferably the Bluetooth low energy standard. The first and second network interface can belong to the same radiofrequency communication module or to two different communication modules.

According to one embodiment, some routers comprise a universal asynchronous receiver transmitter (UART) in order to exchange data according to a wired communication mode. The universal asynchronous receiver transmitter can be comprised in the at least radiofrequency communication module in order to form a mixed radiofrequency and wired communication module. According to one variant embodiment, the universal asynchronous receiver transmitter belongs to a wired communication module.

Some routers are also able to allow connected objects 16 outside the network to join the network securely. When a router performs this function, it is called commissioner 11. Several routers can perform the function of commissioner, but at a given moment, only one commissioner is active in the network of connected objects 10. The routers 14 able to become active commissioner are called "commissioner candidates".

When the commissioner is capable of communicating according to the communication protocol of the network of connected objects, for example, IEEE 802.15.4, it is called "native commissioner". The commissioner 11 performs the function of authentication server for the new connected objects 16 intended to join the network, by implementing an authentication module.

According to one embodiment, the routers 11, 12, 13, 14 are connected objects powered by the electrical power grid or sector in order to have considerable energy autonomy. The routers can play different roles in the working of the network.

In the network of connected objects, a specific router is responsible for performing the function of organizer of the network 12 and managing the configuration of the network. When the organizer of the network 12 fails, another router is automatically designated to take over its function. The organizer of the network manages the requests of the commissioner candidates; it is configured to designate which commissioner candidate is authorized to become the only active commissioner for the network.

The border routers 13 are specific routers. They serve as gateway between the network of connected objects 10 and at least one second external network 20 having a second communication protocol different from the first communication protocol used in the network of connected objects 10. To that end, the radiofrequency communication module of the border router 13 comprises a second network interface able to communicate according to the second communication protocol of the second external network. The second external network can for example be an Internet network, a Wi-Fi network or any other type of communication network. The border router can be a device that has just been connected to the network of connected objects.

The end equipment items 15 are located at end nodes of the network of connected objects. The end equipment items 15 therefore do not participate in the routing of radiofrequency messages over the network of connected items 10. Some end equipment items are called "end equipment items eligible for routing". Such equipment items are capable of becoming routers of the network when new connected objects are connected to one of their ports.

According to one embodiment, the network of connected objects comprises a gateway. The gateway is for example configured to allow a mobile terminal to control and/or command one or several objects connected to the network after configuration.

The system 2 includes a mobile terminal 18 allowing an installer (not shown) to perform the indirect commissioning of the connected objects 16 in the network of connected objects 10, as explained in detail hereinafter.

Figure 2:
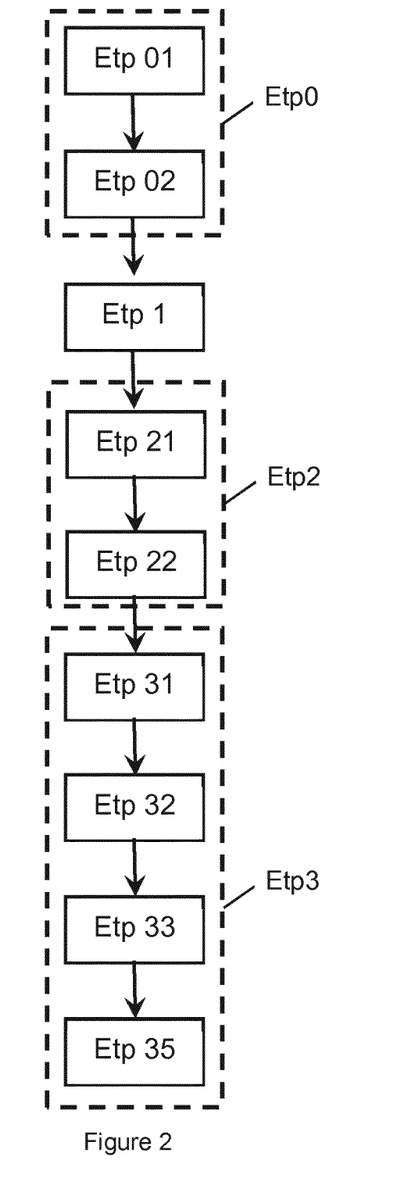
FIG. 2 is a flowchart showing the main steps of an embodiment of the commissioning method according to the invention.

FIG. 2 schematically shows the main steps of an exemplary embodiment of the method according to the invention.

The method for indirect commissioning comprises a first step Etp1 for collecting information useful for the connection of at least one object connected to the network of connected objects. It primarily involves the address and password of the connected object(s) intended to join the network.

The collection is done using the mobile terminal 18 other than a border router. "Mobile terminal" refers to any type of mobile device that may be used to collect the information useful for the connection of the object(s) connected to the network. It may for example involve a laptop computer, a tablet, a smartphone device, etc. However, in the following description, the term "mobile terminal" preferably refers to a smartphone device or a touch-sensitive tablet.

This type of mobile terminal in particular comprises a radiofrequency communication module allowing the two-way exchange of data over a very short distance, for example according to the Bluetooth standard. It also comprises a computing processor and an electronic memory, and one or several man-machine interfaces allowing ergonomic interactions with a user, for example a connected object network installer.

The communication module of the mobile terminal does not comprise a radiofrequency interface arranged to communicate according to the communication protocol of the network of connected objects.

According to one embodiment, the mobile terminal comprises a universal asynchronous receiver transmitter.

When it joins a network, a connected object needs to be authenticated with this network. To that end, each connected object has a unique password and a unique address allowing it to be identified on the network. The address can be the MAC (Media Access Control) address of the connected object, also called EUI-64 (64-bit Extended Unique Identifier). The password is an identifier formed by a random alphanumeric code specific to the connected object that is generated in the plant during its manufacture. Thus, the password exchanged during the commissioning phase is not connected to the network that the connected object is intended to join, but is specific to the connected object. The password is intended to be recorded by the organizer of the network in order to authenticate the addition of the connected object to the network.

According to one embodiment, the password and/or the address of the connected object can be recorded on the connected object, for example by etching or in the form of a tag on which the identifier is printed. According to another embodiment, the password and/or the address of the connected object can be recorded on the connected object in the form of a barcode with one or two dimensions, a radiofrequency identification (or RFID) tag, a near field communication (NFC) tag or any other type of tag readable by the mobile terminal available to the installer.

According to one embodiment, the collection of the information can be done by the installer by manually recording, using the man-machine interface of the mobile terminal, the information read on the connected object(s) intended to join the network, using the man-machine interface of the mobile terminal. The man-machine interface of the mobile terminal can be a real or virtual keyboard.

According to another embodiment, the installer can digitize the barcode containing the information using an optical sensor internal or external to the mobile terminal, for example a camera incorporated into the mobile terminal.

According to another embodiment variant, the installer can collect the information useful for the connection by using a contactless tag reader of the radiofrequency identification and/or near field communication type internal or external to the mobile terminal. When such a reader is outside the mobile terminal, a wired or radio communication link exists making it possible to transmit the collected information to the mobile terminal.

The collected information is next recorded in a memory zone of the mobile terminal.

According to one preferred embodiment, when several connected objects are intended to join the network, the installer collects all of the passwords and addresses of the set of connected objects during the same step Etp1.

During a step Etp2, the collected information is next sent to the network.

During a sub-step Etp21, a commissioner candidate router 14, commissioner 11 or organizer of the network 12 belonging to the network 10 and comprising a communication module able to communicate according to a second communication mode, is switched into a so-called "pre-commissioner" operating mode. Hereinafter, the router placed in the so-called "pre-commissioner" operating mode will be called "pre-commissioner".

The second communication mode can be a second radiofrequency communication protocol shared with the mobile terminal, for example, the Bluetooth standard. To that end, the communication module of the router 11, 12, 14 may comprise a second radiofrequency interface configured to communicate according to the second communication protocol.

The so-called "pre-commissioner" operating mode allows the pre-commissioner to activate the second network interface of its communication module. According to one embodiment, the router thus has Bluetooth connectivity. Preferably, this is Bluetooth low energy (BLE) connectivity. According to one variant embodiment, the second network interface is comprised in a second communication module.

The mobile terminal collects the network address of the pre-commissioner recorded on the latter as previously stated. The radiofrequency communication module of the mobile terminal next connects to the pre-commissioner via a radiofrequency link according to the second communication protocol by using the collected address. The radiofrequency communication module of the mobile terminal next transfers the collected information to the radiofrequency communication module of the pre-commissioner during a sub-step Etp22. The transferred information is next recorded in a memory zone of the pre-commissioner.

According to a variant embodiment that is not shown, the second communication mode is a wired communication mode using the universal asynchronous receiver transmitter. Step Etp2 for transmitting collected information comprises a sub-step for connecting the mobile terminal to a commissioner candidate router 14, commissioner 11 or organizer of the network 12 comprising a universal asynchronous receiver transmitter by means of a wired connection.

According to one embodiment, the router 11, 12, 14 must be placed in the so-called "pre-commissioner" operating mode in order to activate its universal asynchronous receiver transmitter.

During the connection sub-step, the universal asynchronous receivers-transmitters of the communication modules of the mobile terminal and the pre-commissioner are connected together. The universal asynchronous receiver transmitter of the mobile terminal next transmits the collected information to the universal asynchronous receiver transmitter of the pre-commissioner via the wired connection. The transferred information is next recorded in a memory zone of the pre-commissioner.

According to one embodiment, the communications between the communication module of the mobile terminal and the pre-commissioner are encrypted using a shared key, namely the password of the pre-commissioner. To that end, before dialoguing with the pre-commissioner, the mobile terminal collects said password as previously set out.

The commissioning method comprises a step Etp3 for entry of the connected object(s) into the network.

During a sub-step Etp31, the pre-commissioner is placed in a "commissioner" mode. Subsequently, a connected object placed in such an operating mode will be called "commissioner".

The commissioner being part of the network, it is able to dialogue according to the first communication protocol; it is a native commissioner. A commissioner comprises an authentication module configured to process the requests of connected objects intended to join the network and to verify whether each of the connected objects intended to join the network is authorized to enter the network.

According to one embodiment, the switching of the connected object into a "pre-commissioner" mode and/or into a "commissioner" mode can be obtained by an installer by an action on keys of this connected object, for example by pressing on a predefined combination of keys or a predefined sequence of keys.

According to another embodiment, the switching to a "pre-commissioner" and/or "commissioner" mode can be obtained from the mobile terminal via the transmission, for example according to the Bluetooth standard, of a predefined command to the connected object. According to an embodiment variant, the predefined command can be transmitted by the mobile terminal via a wired connection.

The communication module of the commissioner 11 sends the communication module of the organizer of the network 12 the information collected by the mobile terminal 18. Upon reception, the transferred information is recorded in a memory zone of the network organizer.

The connected object 16 intended to join the network connects to the network of connected objects 10 via a radiofrequency link according to the first communication protocol. The radiofrequency communication module of the connected object 16 intended to join the network carries out a discovery procedure of the network in order to obtain various information on the network 10, in particular the network address of the commissioner 11. To that end, the connected object intended to join the network sends a discovery request to all of the connected objects belonging to the network 10 via the first communication protocol. The radiofrequency communication module of the connected object 16 intended to join the network next sends the commissioner a request in order to join the network by authenticating itself, the request in particular comprising its password and its address. The request is received by the radiofrequency communication module of the commissioner during a sub-step Etp32.

According to one embodiment, the sending of the request by the radiofrequency communication module of the connected object 16 can be initiated by the installer by pressing on one or several keys of the connected object, for example, according to a predetermined sequence and/or combination of keys.

According to one variant embodiment, the sending of the request can be initiated by a specific command sent by the radiofrequency communication module of the mobile terminal to the radiofrequency communication module of the connected object intended to join the network.

According to one embodiment, the sending of the request by the radiofrequency communication module of the connected object 16 intended to join the network can be initiated by powering on the connected object.

The authentication module of the commissioner next verifies, during a sub-step Etp33 for authenticating the connected object 16 intended to join the network, whether the address and the password, sent by the connected object, corresponds to a password and address pair recorded in the memory of the commissioner.

If the response is positive, the connected object 16 is considered to be authorized to be part of the network 10 and enters the network. Once in the network, the connected object has the option of communicating with all of the connected objects present in the network.

If the response is negative, the request is rejected.

According to one embodiment, the method may comprise a sub-step Etp35 for sending the mobile terminal the progress of the entry of the connected object(s) into the network. To that end, the radiofrequency communication module of the commissioner can send a radiofrequency message, for example of the Bluetooth type, to the radiofrequency communication module of the mobile terminal. This sub-step may be of interest, for example, when several connected objects must join the network successively. This allows the installer to monitor the progress of the various connected objects and/or to detect authentication errors.

According to the invention, the commissioning of the connected objects is done indirectly. The address and password of each connected object intended to join the network is sent to the network indirectly, by means of a mobile terminal.

Once the connected object(s) have entered the network, the commissioning method may comprise a step Etp4 for establishing functional links between the various connected objects. Functional links between the various connected objects refer to the various links joining the various connected objects having joined the network as well as the links joining the connected objects having joined the network and the connected objects already present in the network. As an illustration, in the case of a home automation installation for example comprising control points, actuators and light points, the functional links can correspond to the radiofrequency connections between the control points and the associated actuators and/or light points.

Step Etp4 for establishing functional links is carried out by the organizer of the network 12.

Figure 3:
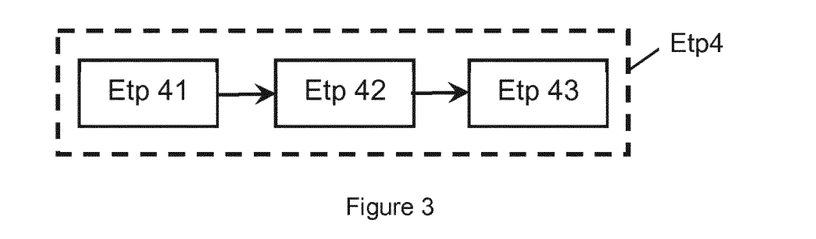
FIG. 3 is a flowchart showing an exemplary embodiment of the step for establishing functional links according to the invention.

In reference to FIG. 3, step Etp4 can comprise a prior step Etp41 for sending, via the radiofrequency communication module of the mobile terminal and to the radiofrequency communication module of the network organizer, a radiofrequency message containing the list of functional links between the various connected objects.

After reception, the sent functional links are recorded, for example, in a memory zone of the network organizer.

According to one preferred embodiment, the transmission of the functional links is done at the same time as the transmission of the addresses and passwords of the connected objects intended to join the network.

The functional links can, for example, be established manually by the installer from the man-machine interface of the mobile terminal.

According to another embodiment, the functional links can be established automatically from application software recorded in a memory zone of the mobile terminal. The mobile terminal can, for example, display icons representing the connected objects intended to join the network and the connected objects already present in the network. Next, by drawing lines between the objects to be connected to one another, the installer establishes the functional links between the various connected objects. Lastly, the functional links are recorded in a memory of the mobile terminal.

During a sub-step Etp42, the authentication module of the commissioner reads the memory zone of the network organizer containing the list of functional links existing between the various connected objects.

During a sub-step Etp43, the network organizer configures the network by pairing the various connected objects of the network with one another as a function of the recorded list of functional links.

Advantageously, step Etp4 for establishing functional links is carried out automatically by the network organizer and therefore does not require the presence of the installer.

According to one embodiment, a same router implements the functions of commissioner and network organizer. In this scenario, no transmission of passwords, address and functional links is necessary between the commissioner and the network organizer.

According to one embodiment, part of the method can be carried out before the commissioning of the connected objects intended to join the network in order to facilitate the commissioning of the connected objects by automating certain tasks. Advantageously, this makes it possible to reduce the operating time of the installer. This step is more advantageous when there are connected objects to be attached to a same network.

The commissioning method may for example comprise a preliminary step Etp0 for pre-configuration of the connected object(s) intended to join a network. This step may for example be done in the plant or at the installer.

The commissioning method may comprise a sub-step Etp01 for pre-configuration of the functional links during which an operator can establish the functional links between the various connected objects by using all of the means at his disposal, such as a computer, or any other computer terminal.

For example, it is assumed that several connected objects are intended to join a network. This may involve creating a network or attaching several connected objects to an existing network. During the pre-configuration sub-step Etp01, the functional links of each object intended to join the network are established, then are stored in the memory of at least one connected object. Once preconfigured, the connected objects thus form a pre-paired assembly.

According to one embodiment, each connected object comprises, in memory, the functional links joining it to the other connected objects intended to join the network and the connected objects present in the network. Each connected object can be programmed to transmit the functional links stored in memory to the network organizer after it enters the network.

According to another embodiment, when several connected objects are intended to join a same network, a connected object can be chosen to store all of the established functional links in its internal memory. During the pre-configuration step Etp0, the functional links of the set of connected objects intended to join the network are stored in the internal memory of the designated connected object. The connected object containing the set of functional links in memory can be configured to transmit the functional links stored in memory to the network organizer after it enters the network.

The commissioning method can comprise a sub-step Etp02 for pre-configuration of a list of information useful for the connection of several objects connected to the network. When several connected objects are intended to join a same network, a connected object can be designated to store, in its internal memory, the list of passwords and addresses of the other connected objects intended to join the network. In this embodiment, the designated connected object is configured to transmit, to the network organizer, the password and address pairs of all of the other connected objects that are authorized to join the network. The transmission of the password and address can take place just after the connected object enters the network.

Thus, during the commissioning of the batch of connected objects, the installer collects (Etp1) the information useful for the connection of the designated connected object and sends it (Etp2) to the pre-commissioner in order to authorize the designated connected object to join (Etp3) the network. Once the designated connected object is authenticated and attached to the network, the latter transmits, to the commissioner, the list of password and address pairs of the connected objects authorized to join the network.

Advantageously, in this embodiment, the collection of a single pair of information items useful for the connection allows the entry, into the network, of all of the connected objects. This makes it possible to reduce the tasks of the installer on the installation worksite, as well as the risks of errors.

Owing to the steps for pre-configuration of the list of connected objects authorized to join the network and pre-configuration of the functional links, during the commissioning of a batch of several connected objects, the presence of the installer is only necessary for the entry of a single connected object, the remainder of the method taking place automatically.

Advantageously, the indirect commissioning method according to the invention does not require any border router connected to the network during the procedure. Additionally, the method makes it possible to benefit from the flexibility and ergonomics of a mobile terminal. Advantageously, the mobile terminal, via its equipment (camera, radiofrequency identification reader, near field reader, etc.) and associated software applications, provides the installer with an interface for commissioning connected objects, in particular during the collection of identifiers and passwords of connected objects intended to join the network and during the establishment of functional links.

Advantageously, the mobile terminal makes it possible, temporarily, to commission one or several connected objects. Thus, the installer is not obligated to use a dedicated device during commissioning phases.

The various modules, such as the radiofrequency communication module and the authentication module, may be one or several microprocessors, processors, computers or any other equivalent means programmed appropriately.

The various modes of implementation, embodiments and variants defined above may be combined in order to generate new modes of implementation and new embodiments of the invention.

The invention claimed is:

1. A method for indirect commissioning of at least one connected object configured to join a network of connected objects, the network of connected objects including at least an organizer of the network and a commissioner, each of the organizer and the commissioner including a communication module, the communication module including a first radiofrequency interface configured to communicate according to a first communication protocol, the method comprising:
    collecting useful information for connection of the at least one connected object to be connected to the network of connected objects by a mobile terminal other than a border router, the mobile terminal comprising a communication terminal configured to communicate according to a second communication protocol, the mobile terminal collecting the useful information based on a reading of the useful information directly from the at least one connected object to be connected before an actual connection to the network of connected objects;
    transmitting the collected information by the mobile terminal directly to the commissioner, the commissioner belonging to the network of connected objects; and
    entering, by the at least one connected object, into the network of connected objects using the useful information.

2. The method according to claim 1, further comprising establishing functional links between the connected objects implemented by the organizer of the network.

3. The method according to claim 2, wherein the establishing the functional links comprises:
    receiving a radiofrequency message containing the functional links,
    reading the functional links in a memory of the organizer of the network, and
    configuring the network as a function of the functional links.

4. The method according to claim 2, further comprising pre-configuring at least one of the connected objects.

5. The method according to claim 2, wherein the transmitting the collected information comprises:
    activating a second network interface of the commissioner operating according to the second communication protocol, and
    transmitting, by the communication module of the mobile terminal, the information collected via a link using the second communication protocol.

6. The method according to claim 1, further comprising pre-configuring at least one of the connected objects.

7. The method according to claim 6, wherein the pre-configuring comprises pre-configuring functional links of the at least one connected object.

8. The method according to claim 7, wherein the pre-configuring comprises pre-configuring a list of information useful for the connection of a plurality of the connected objects connected to the network.

9. The method according to claim 7, wherein the establishing the functional links comprises:
    receiving a radiofrequency message containing the functional links,
    reading the functional links in a memory of the organizer of the network, and
    configuring the network as a function of the functional links.

10. The method according to claim 6, wherein the pre-configuring comprises pre-configuring a list of information useful for the connection of a plurality of the connected objects connected to the network.

11. The method according to claim 10, wherein the establishing the functional links comprises:
    receiving a radiofrequency message containing the functional links,
    reading the functional links in a memory of the organizer of the network, and
    configuring the network as a function of the functional links.

12. The method according to claim 6, wherein the establishing the functional links comprises:
    receiving a radiofrequency message containing the functional links,
    reading the functional links in a memory of the organizer of the network, and
    configuring the network as a function of the functional links.

13. The method according to claim 6, wherein the transmitting the collected information comprises:
    activating a second network interface of the commissioner operating according to the second communication protocol, and
    transmitting, by the communication module of the mobile terminal, the information collected via a link using the second communication protocol.

14. The method according to claim 1, wherein the transmitting the collected information comprises:

activating a second network interface of the commissioner operating according to the second communication protocol, and transmitting, by the communication module of the mobile terminal, the information collected via a link using the second communication protocol.

15. The method according to claim 14, wherein the second communication protocol is the Bluetooth standard.

16. The method according to claim 1, wherein the transmitting the collected information comprises:

connecting the mobile terminal to the commissioner by a wired connection, and transmitting, by the mobile terminal, information collected via the wired connection.

17. The method according to claim 1, wherein the entering at least one connected object into the network comprises:

activating the radio interface working according to the first communication protocol of the radiofrequency communication module of the commissioner, receiving a request from the connected object configured to join the network by the radiofrequency communication module of the commissioner, and authenticating the connected object configured to join the network.

18. A system for indirectly commissioning at least one connected object according to the indirect commissioning method according to claim 1, the system comprising:

the network of connected objects comprising the at least an organizer of the network and the commissioner;

the at least one connected object configured to join the network of connected objects; and the at least one mobile terminal, wherein each of the connected objects including a radiofrequency communication module comprising a first radiofrequency interface configured to communicate according to the first communication protocol.

19. The system according to claim 18, wherein the organizer of the network implements functions of the commissioner.

20. The method according to claim 1, wherein the mobile terminal is not one of the connected objects in the network of connected objects.

* * * * *